No. 607,083. Patented July 12, 1898.
D. ROCHE.
FIRE ESCAPE.
(Application filed Nov. 15, 1897.)
(No Model.) 2 Sheets—Sheet 1.

Witnesses.
Benjamin Clark
Cecil Ford

Inventor.
David Roche
per E. Eaton
His Attorney.

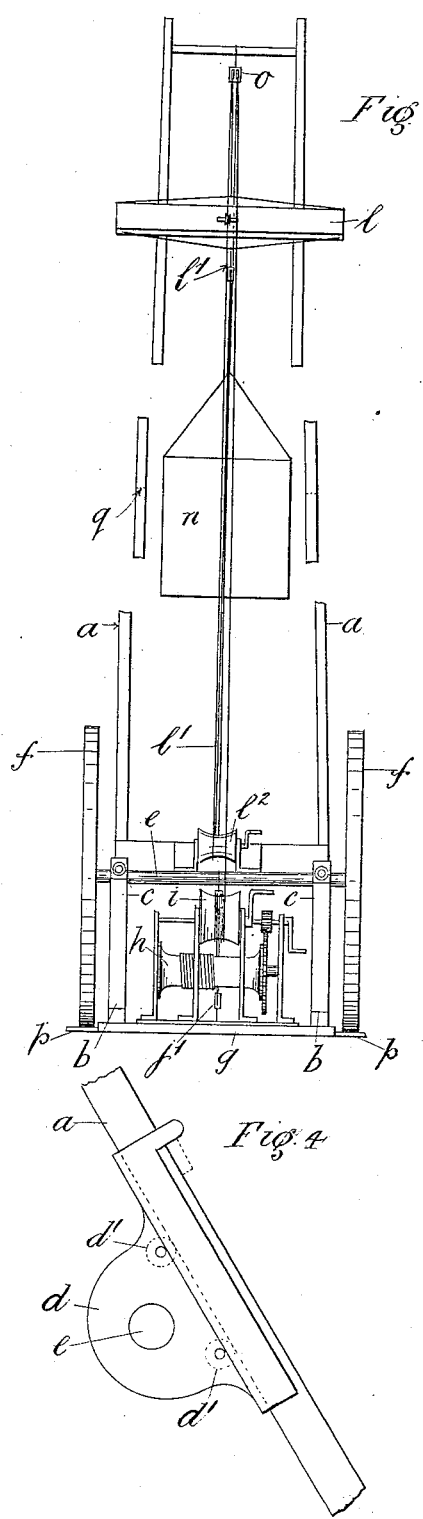

UNITED STATES PATENT OFFICE.

DAVID ROCHE, OF LONDON, ENGLAND.

FIRE-ESCAPE.

SPECIFICATION forming part of Letters Patent No. 607,083, dated July 12, 1898.

Application filed November 15, 1897. Serial No. 658,601. (No model.)

*To all whom it may concern:*

Be it known that I, DAVID ROCHE, a subject of the Queen of Great Britain, and a resident of Ealing, London, in the county of Middlesex, England, have invented certain new and useful Improvements in Fire-Escapes, of which the following is a full, clear, and exact specification.

This invention consists of a new or improved method of raising or lowering fire-escapes and the like; and it consists of a movable bearing carried upon wheels which by being moved will raise or lower a structure or erection which is movably secured to a platform and which is supported in the movable bearings aforesaid. Moving bearing-surfaces are provided upon the platform, so that the wheels aforesaid may rest upon same when required. A basket or cage is provided, which is raised or lowered by means of a winch or other suitable means, a traveling bar or rod being employed for the purpose of varying the position of the basket when being raised or lowered. The whole may be moved about upon the wheels aforesaid for purposes of transit.

For purposes of illustration I will now refer to the annexed drawings, in which—

Figure 1:
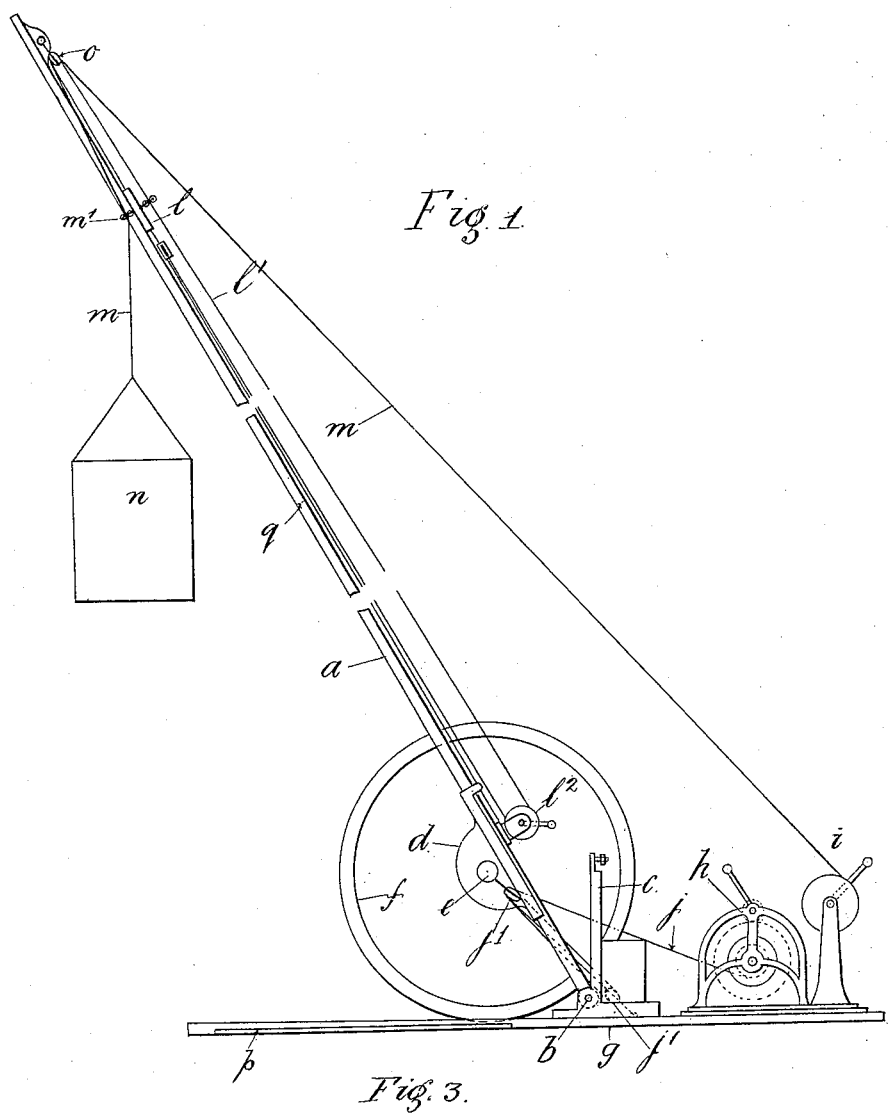
Figure 3:
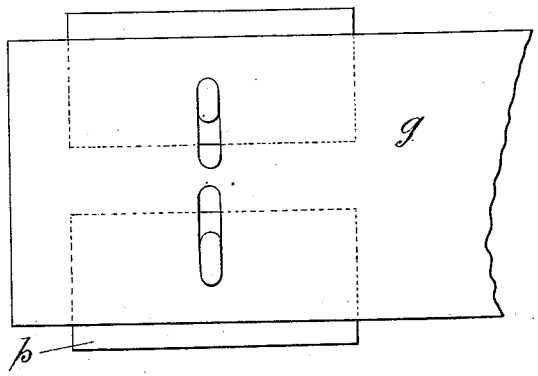

Figure 1 is a side elevation of my invention; Fig. 2, a front elevation; Fig. 3, a plan view of movable bearing-surfaces; Fig. 4, an enlarged view of movable bearing.

$a$ $a$ are two limbs or uprights, of suitable material, forming a structure or erection, which are pivoted at $b$ to a platform or support $g$.

$c$ are stop-pieces or the like which are provided with locking-catches of any suitable form for securing the frame in its vertical position when required.

$d$ are the movable bearings, having the rollers $d'$, upon which the limbs $a$ rest, this movable bearing being supported upon the axle $e$, which carries the wheels $f$. The platform $g$ carries the winch $h$ and pulley $i$.

$j$ is a cord which is attached to the movable bearing at any convenient part thereof and to the platform $g$ through the medium of the pulley-blocks $j'$ and is wound upon the winch $h$ for the purpose of raising or lowering the structure or erection.

$l$ is a traveling bar or carrier which can be raised or lowered upon the structure or erection by means of the ropes or the like $l'$ through the medium of any convenient means, such as a pulley or the like, which may be operated by means of a handle or crank or other suitable means. The rope or the like $m$ is attached to the cage or basket $n$ and passes through the pulley $o$ for the purpose of enabling the cage $n$ to be raised or lowered. This rope also passes through a pulley on the traveling bar or carrier $l$, and thus the cage may, if desired, be caused to move in a direction parallel to that of the structure or erection $a$.

$p$ are movable surfaces which may be caused to project from the sides of the platform $g$ for the purpose of receiving the wheels when the structure or erection is being raised or lowered.

It will be seen that after the structure or erection has been raised to its vertical position by further operating the winch the platform may be raised from the ground, and thus enable the whole to be readily turned upon the bearing-wheels.

When it is required to move or transport the structure or erection, the movable surfaces are withdrawn from under the wheels, and the whole may then be moved upon the wheels. The structure or erection may be jointed in one or more places, as indicated by the dotted lines $q$, any convenient form of joint or hinge being employed, so as to enable the same to be folded when required for transport. It will also be seen that this form of erection is particularly suitable for use as a fire-escape, as the cage may be manipulated so as to be available in situations in which an ordinary fire-escape is useless owing to the same being operated through the medium of the traveling bar or carrier.

Having thus described my invention, what I claim, and desire to secure by Letters Patent, is—

In means for raising and lowering a structure, a platform, a structure comprising limbs pivoted to said platform, wheels, a bearing carried by said wheels and slidably engaging said limbs, blocks and tackle for operating said bearing, plates slidably engaging said platform for the reception of said wheels, a cage, a bar adapted to travel upon said structure, means for operating said bar, and means engaging said bar for operating said cage, substantially as set forth.

In testimony that I claim the foregoing I have hereunto set my hand this 28th day of October, 1897.

D. ROCHE.

Witnesses:
 BENJAMIN CLARK,
 WILLIAM JOHN WEEKS.